United States Patent [19]

Nozaki et al.

[11] Patent Number: 5,274,052
[45] Date of Patent: Dec. 28, 1993

[54] RESIN COMPOSITION FOR POWDER COATINGS

[75] Inventors: Tokuzo Nozaki; Katsuyoshi Atsumi; Katsuya Fujimoto, all of Aichi, Japan

[73] Assignee: Nippon Ester Co., Ltd., Aichi, Japan

[21] Appl. No.: 903,473

[22] Filed: Jun. 24, 1992

[30] Foreign Application Priority Data

Jun. 25, 1991 [JP] Japan .................. 3-180287

[51] Int. Cl.$^5$ .............................. C08G 63/12
[52] U.S. Cl. ................... 525/444; 525/437; 528/272; 528/302; 528/308.6; 528/308
[58] Field of Search ................... 525/437, 444

[56] References Cited

U.S. PATENT DOCUMENTS

| | | | |
|---|---|---|---|
| 3,607,975 | 9/1971 | Tsukedo | 200/850 |
| 4,371,638 | 1/1983 | Bernelin et al. | 528/427 |
| 5,102,977 | 4/1992 | McLafferty | 528/272 |

FOREIGN PATENT DOCUMENTS 1563023  3/1980  United Kingdom .

OTHER PUBLICATIONS

Database WPIL, Week 8907, Derwent Publications Ltd., London, GB; AN 89–051356.

Primary Examiner—James J. Seidleck
Assistant Examiner—Mary Critharis
Attorney, Agent, or Firm—Sughrue, Mion, Zinn, Macpeak & Seas

[57] ABSTRACT

A resin composition for powder coating which comprises a substantially un-gelled polyester A having a hydroxyl value of from 1,200 to 5,000 g eq/$10^6$ g, a substantially un-gelled polyester B having a hydroxyl value of from 200 to 1,000 g eq/$10^6$ g, tetramethoxymethyl glycoluril as a curing agent and an organic sulfonic acid compound as a curing catalyst, wherein the weight ratio of polyester A to polyester B is from 70:30 to 10:90 and the difference (absolute value) in the gel time between polyester A and polyester B is at least 3 minutes.

7 Claims, No Drawings

RESIN COMPOSITION FOR POWDER COATINGS

FIELD OF THE INVENTION

The present invention relates to a resin composition for use in powder coatings, which forms a semi-mat or mat paint film.

BACKGROUND OF THE INVENTION

Among generally used powder coatings including epoxide-, acrylate- and polyester-based coatings, polyester-based powder coatings are known to form paint films having excellent properties.

Powder coatings are used in various fields including household electrical goods, automobiles, building materials and the like. From the aesthetic point of view, the coated surface of the paint film is required to be glossy (60° specular gloss, about 90 to 100%), mat (60° specular gloss, about 30% or less) or semi-mat (60° specular gloss, about 30 to 70%).

In general, such a mat or semi-mat powder coating is prepared by a process in which a rough particled pigment is used as an additive agent in a large quantity or by a process in which a polyester powder coating and an acrylic powder coating are dry-blended (JP-B-61-19668). (The term "JP-B" as used herein means an "examined Japanese patent publication")

However, the addition of a large quantity of a rough particled pigment reduces the smoothness and mechanical strength of the resulting paint film. Also, the latter process in which two types of powder coatings are dry-blended has disadvantages in that a mat or semi-mat coating cannot be obtained in a single step, thus entailing high cost for the production of the coating, as well as non-uniformity of the blend and change in the blending ratio at the time of recycle use.

With the object of overcoming such problems, a resin composition for use in powder coatings has been proposed in JP-A-64-1770 which comprises a polyester having a hydroxyl value of 1,200 g eq/$10^6$ g or more, another polyester having a hydroxyl value of from 200 to 1,000 g eq/$10^6$ g and a curing agent of the blocked isocyanate type, where the difference in the gel times between these two polyesters is at least 3 minutes. (The term "JP-A" as used herein means an "unexamined published Japanese patent application.)

However, the preparation of a powder coating using this prior art resin composition requires to use a great amount of the curing agent, which has only 2 to 3 functional groups, thus entailing high cost for the production thereof. Further, this prior art has disadvantages in that the blocking agent scatters and pollutes a baking oven when the polyesters are allowed to react with the curing agent of the blocked isocyanate type, and about 10% weight loss occurs at the same time.

These problems have been attempted to be settled by the use of tetramethoxymethyl glycoluril curing agent of a tetrafunctional compound but the curing agent has not functioned sufficiently due to absence of a suitable catalyst for this curing agent.

In view of the above, the present invention is directed to overcoming the aforementioned problems involved in the prior art, thereby providing an inexpensive resin composition for powder coating use which does not pollute a baking oven, which shows less weight loss at the time of reaction and which can form a stable semi-mat or mat paint film.

SUMMARY OF THE INVENTION

The inventors conducted intensive studies to solve the prior art problems and found that this object can be achieved by combining two types of polyesters, each having a specific hydroxyl value, with tetramethoxymethyl glycoluril curing agent and an organic sulfonic acid compound curing agent. The present invention was reached on the basis of this finding.

According to the present invention, there is provided a resin composition for powder coating which comprises a substantially un-gelled polyester A having a hydroxyl value of from 1,200 to 5,000 g eq/$10^6$ g, a substantially un-gelled polyester B having a hydroxyl value of from 200 to 1,000 g eq/$10^6$ g, tetramethoxymethyl glycoluril as a curing agent and an organic sulfonic acid compound as a curing catalyst, wherein the weight ratio of polyester A to polyester B is from 70:30 to 10:90 and the difference (absolute value) in the gel time between polyester A and polyester B is at least 3 minutes.

Other objects and advantages will be made apparent as the description progresses.

DETAILED DESCRIPTION OF THE INVENTION

In the present invention, hydroxyl value and gel time are determined by the following procedures.

Hydroxyl Value

A polyester sample (3 g) is dissolved in a mixture comprising 54.4 ml of pyridine and 0.6 ml of acetic anhydride under reflux (boiling point: 116° C.) over a period of 45 min. and its hydroxyl value is measured by titrating the resulting solution with a methanol solution of potassium hydroxide (0.5N).

Gel Time

A polyester sample whose gel time is to be measured is mixed with a curing agent of tetramethoxymethyl glycoluril (POWDERLINK*1174, manufactured by American Cyanamid Co.) in such a mixing ratio that functional groups become equivalent, 0.2% by weight of p-toluenesulfonic acid as a curing catalyst and 33% by weight of titanium dioxide powder (particle size: 0.2 to 0.5 μm), based on the total amount of the mixture. Using 90 g of the thus prepared sample, a curing curve at 170° C. is obtained by using a Brabender Plasticoder PLV-151 (available from Brabender), and the time required to reach the point of inflection is defined as the gel time.

In the resin composition of the present invention, polyester A should have a hydroxyl value of from 1,200 to 5,000 g eq/$10^6$ g, preferably in the range of from 2,000 to 4,000 g eq/$10^6$ g, and polyester B should have a hydroxyl value of from 200 to 1,000 g eq/$10^6$ g. If the hydroxyl value of polyester A is smaller than 1,200 g eq/$10^6$ g, polyester A provides no significant matting effect. If the hydroxyl value of polyester A is larger than 5,000 g eq/$10^6$ g, the resulting resin composition does not provide properties necessary for coating use due to a low degree of polymerization. If the hydroxyl value of polyester B is smaller than 200 g eq/$10^6$ g, this causes considerable irregularity on the surface of the resulting paint film, thus resulting in a reduction in smoothness. If the hydroxyl value of polyester B is larger than 1,000 g eq/$10^6$ g, this reduces the mechanical strength of the resulting paint film and polyester B provides no significant matting effect.

Polyesters A and B should be in a substantially un-gelled state. The term "substantially un-gelled polyester" as used herein means a polyester which can be crushed to particle size of 500 to 1,000 μm using general crushers (e.g., SAMPLE MILL AP-S mfd. by Hosokawamikuron K.K.) and which shows fluidity when the polyester powder is placed on a plate heated to above the melting point of the polyester. It is difficult to prepare a coating and to form a uniform paint film when a gelled polyester is used.

The curing agent may be used in such an amount that equivalency of the number of its functional groups to the number of hydroxyl groups in the polyester resins is from 0.8 to 1.2.

In the resin composition of the present invention, polyester A is blended with polyester B in a weight ratio of from 70:30 to 10:90, preferably from 40:60 to 20:80. Mixing ratios departing from this range will provide no significant matting effect.

In the resin composition of the present invention, it makes no difference in the paint film property which of polyesters A and B has the longer gel time but the difference (absolute value) in the gel times between polyesters A and B should be at least 3 minutes, preferably 3 to 15 minutes. A mat paint surface cannot be obtained when the gel time difference is less than 3 minutes and the gel time difference may be 5 to 15 minutes when a highly mat paint surface (60° specular gloss, 20% or less) is required. Use of resins with difference in gel time departing from this range will bear no significant matting effect and reduce mechanical strength.

According to the present invention, the matting degree can be controlled by changing the hydroxyl value of polyester A and the mixing ratio and gel time difference of polyesters A and B. For example, when the hydroxyl value of polyester A is about 2,500 g eq/$10^6$ g or more and the mixing ratio of polyesters A and B is 3:7, a semi-mat paint surface having a 60° specular gloss of 50 to 60% can be obtained by blending the resins having a gel time difference of 3 to 4 minutes. In the same manner, a mat paint surface having a 60° specular gloss of about 20% can be obtained by blending the resins having a gel time difference of about 5 minutes, and a completely mat paint surface having a 60° specular gloss of 10% or less can be obtained by blending the resins having a gel time difference of 6 minutes or more.

Examples of preferred polyester A as a component of the resin composition of the present invention may be those prepared from the following carboxylic acid and alcohol components.

Carboxylic Acid Component

A component consisting of terephthalic acid and/or isophthalic acid as the main constituent (85 mole % or more), if necessary, other polycarboxylic acids including aromatic dicarboxylic acids such as 2,6-naphthalene dicarboxylic acid and the like, aliphatic dicarboxylic acids such as succinic acid, adipic acid, azelaic acid and the like, and alicyclic dicarboxylic acids such as 1,4-cyclohexane dicarboxylic acid and the like. If desired, a small quantity of a polycarboxylic acid having 3 or more carboxyl groups can be added thereto such as trimellitic acid, piromellitic acid and the like.

Alcohol Component

A component consisting of trifunctional alcohols such as trimethylolethane, trimethylolpropane, 3-methylpentane-1,3,5-triol and glycerol as the main constituent (85 mole % or more), further supplemented if necessary with dihydric alcohols including aliphatic glycols such as ethylene glycol, diethylene glycol, 1,2-propanediol, neopentyl glycol and the like and a small quantity of tetrafunctional alcohols such as pentaerythritol and the like.

Examples of preferred polyester B as a component of the resin composition of the present invention may be those prepared from the following carboxylic acid and alcohol components.

Carboxylic Acid Component

A component consisting of terephthalic acid and/or isophthalic acid as the main constituent (85 mole % or more), further supplemented if necessary with other polycarboxylic acids, e.g., aromatic dicarboxylic acids such as 2,6-naphthalene dicarboxylic acid and the like, aliphatic dicarboxylic acids such as succinic acid, adipic acid, azelaic acid and the like, alicyclic dicarboxylic acids such as 1,4-cyclohexane dicarboxylic acid and the like.

Alcohol Component

A component consisting of ethylene glycol and neopentyl glycol as the main constituent (85 mole % or more), further supplemented if necessary with other aliphatic glycols such as diethylene glycol, 1,2-propanediol and the like.

Polyesters A and B may preferably have a number average polymerization degree of from 5 to 50 so that pulverization can be performed easily.

Also, polyesters A and B may preferably have a softening point of from 50° to 150° C. Softening points of lower than 50° C. would cause aggregation of pulverized resins and subsequent solidification, thus resulting in reduced anti-blocking ability, and that of higher than 150° C. would require a high kneading temperature which accelerates the curing reaction at the time of coating preparation, thus resulting in a reduction of the smoothness and mechanical strength of paint films.

In the present invention, tetramethoxymethyl glycoluril may be used as a curing agent, which is commercially available from American Cyanamid Co. in the trade name of POWDERLINK*1174.

In the present invention, organic sulfonic acid compounds can be used as a curing catalyst, among which aromatic sulfonic acid compounds are preferably used. Illustrated examples of the organic sulfonic acid compounds to be used in the present invention include p-toluenesulfonic acid, o-, m- or p-nitrobenzenesulfonic acid, nitrobenzene-2,4-disulfonic acid, 2-nitrotoluene-3-sulfonic acid, o-sulfobenzoic acid, sulfosalicylic acid, sulfophthalic acid, 2,4-dinitrobenzenesulfonic acid, 3,5-dinitrobenzenesulfonic acid and 3-nitro-o-xylene-4-sulfonic acid, and derivatives of such compounds. Of these compounds, preferred are p-toluenesulfonic acid, o-, m- or p-nitrobenzenesulfonic acid, nitrobenzene-2,4-disulfonic acid, 2-nitrotoluene-3-sulfonic acid, o-sulfobenzoic acid and sulfosalicylic acid, more preferably, p-toluenesulfonic acid, o-sulfobenzoic acid and sulfosalicylic acid.

The curing catalyst may be preferably added in an amount of 0.05 to 3 parts by weight, more preferably, 0.1 to 1 part by weight, per 100 parts by weight of the total amount of polyester A, polyester B and the curing agent. If the addition amount of the curing catalyst is smaller than 0.05 part, the catalyst provides no effect, and, if larger than 3 parts, no further effect can be obtained with the resulting paint film being colored yellow.

The resin composition for powder coating of the present invention can be prepared by kneading polyesters A and B with the curing agent and the curing catalyst at a temperature of from 70° to 150° C. using a kneader or a roll.

If desired, the resin composition of the present invention may be mixed with additive agents such as a leveling agent and the like.

The following inventive and comparative examples are provided to further illustrate the present invention.

In this instance, characteristic values were measured in accordance with the following procedures.

Mean Polymerization Decree

Measured by gel permeation chromatography.

Hydroxyl Value

Measured by the aforementioned procedure.

Softening Point

Measured by visual observation by heating a sample on a hot bench (Type WME, mfd. by REICHERT JUNG CO.).

Gel Time

Measured by the aforementioned procedure except that the temperature is increased to 200° C. in Comparative Examples wherein the blocked isocyanate type curing agent is employed.

60° Specular Gloss

Measured in accordance with JIS K 5400.

Smoothness

Evaluated by visually observing the smoothness of paint films.

Impact Resistance

Measured in accordance with JIS K 5400 using 500 g of ½ inch balls.

Pencil Hardness

Measured in accordance with JIS K 5400.

Accelerated Weather Resistance

Measured in accordance with JIS K 5400 (200 hours).

Weight Loss

Measured as a ratio of the difference in weight before and after the reaction to the weight before the reaction.

REFERENCE EXAMPLE 1

Preparation of Polyester A

A stainless steel reaction vessel equipped with an agitator was charged with the compounds shown in Table 1 and stirred with heating at 230° C. under a normal pressure for 8 hours, while water formed was removed continuously from the reaction system. Then, the reaction was carried out for 3 hours at 230° C. under a reduced pressure of 600 mmHg to obtain polyester resin 1.

REFERENCE EXAMPLE 2

Preparation of Polyester A

A stainless steel reaction vessel equipped with an agitator was charged with the compounds shown in Table 1 and stirred with heating at 250° C. under a normal pressure for 6 hours, while water formed was removed continuously from the reaction system. To the resulting mixture there was added 5.84 parts by weight of antimony trioxide as a polycondensation reaction catalyst, and the reaction was carried out for 4 hours at 280° C. under a reduced pressure of not higher than 0.50 mmHg. After reducing the temperature to 270° C., the compounds shown in Table 2 were added to the resulting polyester resin having a high polymerization degree and depolymerization reaction was carried out under closed conditions for 1 hour to obtain polyester resin 2.

REFERENCE EXAMPLES 3 and 4

Preparation of Polyester B

A stainless steel reaction vessel equipped with an agitator was charged with the compounds shown in Table 1 and the mixture was stirred with heating at 250° C. under a normal pressure for 6 hours, while water formed was continuously removed from the reaction system. To the resulting mixture there was added 5.84 parts by weight of antimony trioxide as a catalyst, and condensation polymerization reaction was carried out for 2 hours at 270° C. under a reduced pressure of 0.50 to 1.0 mmHg to obtain polyester resins 3 and 4.

REFERENCE EXAMPLES 5 and 6

Preparation of Polyester B

The process of Reference Example 2 was repeated to obtain polyester resins 5 and 6, except that the types and amounts of the compounds were changed in accordance with Tables 1 and 2.

REFERENCE EXAMPLES 7 and 8

Preparation of Polyester B

A stainless steel reaction vessel equipped with an agitator was charged with the compounds shown in Table 1 and 4.39 parts by weight of zinc acetate as an ester exchange reaction catalyst and the mixture was stirred with heating at 220° C. under a normal pressure for 8 hours, while methanol formed was continuously removed from the reaction system. To the resulting mixture there was added 5.84 parts by weight of antimony trioxide as a catalyst, and condensation polymerization reaction was carried out for 4 hours at 280° C. under a reduced pressure of not higher than 0.50 mmHg to obtain polyester resins having a high polymerization degree. After reducing the temperature to 270° C., the compounds shown in Table 2 were added to the polyester and depolymerization reaction was carried out under closed conditions for 1 hour to obtain polyester resins 7 and 8.

The characteristic values of each polyester resin thus prepared are shown in Table 3.

TABLE 1

| Ref. Ex. | 1 | 2 | 3 | 4 | 5 | 6 | 7 | 8 |
|---|---|---|---|---|---|---|---|---|
| Terephthalic acid | 8300 | 16600 | 12450 | 16600 | 13280 | 11620 | | |
| Isophthalic acid | 8300 | | 4150 | | 3320 | 4980 | | |
| Dimethyl terephthalate | | | | | | | 19400 | 17460 |
| Dimethyl isophthalate | | | | | | | | 1940 |
| Ethylene glycol | | 7440 | 9920 | 6820 | 5580 | 9300 | 3100 | |
| Neopentyl glycol | 520 | 4160 | | 5200 | 7280 | | 11440 | 16640 |
| Diethylene glycol | | | | | | 1060 | | |
| Trimethylolpropane | 16000 | | 540 | 540 | | | | |

TABLE 2

| Ref. Ex. | 2 | 5 | 6 | 7 | 8 |
|---|---|---|---|---|---|
| Trimethylolpropane | 1340 | 268 | 670 | 670 | 670 |
| Neopentyl glycol | | 208 | | 174 | |

(The numbers in Tables 1 and 2 are parts by weight.)

TABLE 3

| Polyester | 1 | 2 | 3 | 4 | 5 | 6 | 7 | 8 |
|---|---|---|---|---|---|---|---|---|
| Mean polymer. degree | 5.1 | 10.5 | 23.3 | 25.5 | 24.2 | 20.9 | 13.7 | 20.8 |
| Hydrox. val. (g eq/10$^6$ g) | 4550 | 1300 | 590 | 570 | 510 | 660 | 770 | 610 |
| Softening point (°C.) | 73 | 71 | 79 | 86 | 85 | 78 | 77 | 80 |
| Gel time (min.) | 3.5 (4.0)* | 7.0 | 6.1 | 8.5 | 10.5 (11.4)* | 8.0 | 10.8 | 17.5 |

*Values obtained using blocked isocyanate type curing agent (B-1530, mfd. by Hüls Co.)

EXAMPLES 1 to 7 AND COMPARATIVE EXAMPLES 1 to 6

Two of the polyester resins shown in Tables 4 and 5, tetramethoxymethyl glycoluril as a curing agent (POWDERLINK*1174, mfd. by American Cyanamid Co.), a butylpolyacrylate type leveling agent (Acronal 4F, manufactured by BASF), benzoin, titanium dioxide (particle size 0.2 to 0.5 μm) and a curing catalyst were subjected to dry blending with the mixing ratio being as shown in Tables 4 and 5 at 2,000 to 3,000 rpm for 3 to 5 minutes using a Henschel mixer (FM 10B, manufactured by Mitsui Miike Machinery Co., Ltd.). The resulting blend was melt-kneaded at 110° C. using a co-kneader (PR-46, manufactured by Buss). After cooling, the kneaded product was crushed and filtered through a 145 mesh wire net to obtain a powder coating.

The thus obtained powder coating was coated on a zinc phosphate-treated steel sheet to a film thickness of 50 to 60 μm by electrostatic coating, followed by 20 minutes of baking at 170° C. or at 200° C.

Results of the evaluation of paint film properties are shown in Tables 6 and 7, together with gel time differences of the polyester resin.

TABLE 4

| Example No. | 1 | 2 | 3 | 4 | 5 | 6 | 7 |
|---|---|---|---|---|---|---|---|
| Polyester resin 1 | 25 | 25 | 25 | 17 | 25 | | |
| Polyester resin 2 | | | | | | 27 | 28 |
| Polyester resin 4 | 59 | | | | | | |
| Polyester resin 5 | | 59 | | | | | |
| Polyester resin 7 | | | 58 | 69 | | 64 | |
| Polyester resin 8 | | | | | 59 | | 64 |
| Tetramethoxymethyl glycoluril | 16 | 16 | 17 | 14 | 16 | 9 | 8 |
| p-Toluenesulfonic acid | 0.2 | 0.2 | 0.2 | 0.2 | 0.2 | 0.2 | 0.2 |
| Leveling agent | 1 | 1 | 1 | 1 | 1 | 1 | 1 |
| Benzoin | 1.5 | 1.5 | 1.5 | 1.5 | 1.5 | 1.5 | 1.5 |
| Titanium dioxide | 50 | 50 | .50 | 50 | 50 | 50 | 50 |

TABLE 5

| Comp. Ex. No. | 1 | 2 | 3 | 4 | 5 | 6 |
|---|---|---|---|---|---|---|
| Polyester resin 1 | | 57 | 5 | | 25 | 20 |
| Polyester resin 2 | 28 | | | | | |
| Polyester resin 4 | 64 | | | | | |
| Polyester resin 5 | | 66 | 14 | 89 | 59 | 48 |
| Polyester resin 6 | | 29 | | | | |
| Tetramethoxymethyl glycoluril | 8 | 5 | 29 | 6 | | |
| Blocked isocyanate | | | | | 16 | 32 |
| p-Toluenesulfonic acid | 0.2 | 0.2 | 0.2 | 0.2 | | |
| Leveling agent | 1 | 1 | 1 | 1 | 1 | 1 |
| Benzoin | 1.5 | 1.5 | 1.5 | 1.5 | 0.5 | 0.5 |
| Titanium dioxide | 50 | 50 | 50 | 50 | 50 | 50 |

(The numbers in Tables 4 and 5 are parts by weight.)

TABLE 6

| Ex. No. | 1 | 2 | 3 | 4 | 5 | 6 | 7 |
|---|---|---|---|---|---|---|---|
| Baking tem. (°C.) | 170 | 170 | 170 | 170 | 170 | 170 | 170 |
| Difference in gel time (min.) | 5.0 | 7.0 | 7.3 | 7.3 | 14.0 | 3.8 | 10.5 |
| 60° Specular gloss (%) | 24 | 5 | 4 | 30 | 5 | 48 | 31 |
| Smoothness | good | good | good | good | good | good | good |

TABLE 6-continued

| Ex. No. | 1 | 2 | 3 | 4 | 5 | 6 | 7 |
|---|---|---|---|---|---|---|---|
| Impact strength (cm) | >50 | >50 | 40 | >50 | >50 | >50 | >50 |
| Pencil hardness | H | 2H | H | H | 2H | H | H |
| Weight loss (%) | 1.7 | 1.7 | 1.8 | 1.4 | 1.6 | 0.8 | 0.8 |
| Accelerated weather resistance | n.p. | n.p. | n.p. | n.p. | n.p. | n.p. | n.p.* |

(*no problem)

TABLE 7

| Comp. Ex. No. | 1 | 2 | 3 | 4 | 5 | 6 |
|---|---|---|---|---|---|---|
| Baking tem. (°C.) | 170 | 170 | 170 | 170 | 170 | 200 |
| Difference in gel time (min.) | 1.5 | 2.5 | 7.0 | 7.0 | 7.4 | 7.4 |
| 60° Specular gloss (%) | 80 | 75 | 90 | 92 | 95 | 8 |
| Smoothness | good | good | good | good | good | good |
| Impact strength (cm) | 40 | >50 | 35 | >50 | <10 | >50 |
| Pencil hardness | H | HB | 3H | HB | B | H |
| Weight loss (%) | 0.9 | 0.6 | 2.2 | 0.7 | 0.8 | 12.2 |
| Accelerated weather resistance | n.p. | n.p. | n.p. | n.p. | n.p. | n.p.* |

(*no problem)

Thus, it is clear that there has been provided, in accordance with the present invention, a resin composition for powder coating which causes no problems of polluting a baking oven, which shows less weight loss at the time of reaction and which can form a semi-mat or completely mat paint film with excellent mechanical strength, with ease at a low cost.

While the invention has been described in detail and with reference to specific examples thereof, it will be apparent to one skilled in the art that various changes and modification can be made therein without departing from the spirit and scope thereof.

What is claimed is:

1. A resin composition for powder coating which comprises a substantially un-gelled polyester A having a hydroxyl value of from 1,200 to 5,000 g eq/$10^6$ g, a substantially un-gelled polyester B having a hydroxyl value of from 200 to 1,000 g eq/$10^6$ g, tetramethoxymethyl glycoluril as a curing agent and an organic sulfonic acid compound as a curing catalyst, wherein the weight ratio of polyester A to polyester B is from 70:30 to 10:90 and the difference (absolute value) in the gel time between polyester A and polyester B is at least 3 minutes.

2. The resin composition according to claim 1, wherein polyester A comprises terephthalic acid and/or isophthalic acid as main acid components and trimethylolpropane and ethylene glycol and/or neopentyl glycol as main alcohol components and polyester B comprises terephthalic acid and/or isophthalic acid as main acid components and ethylene glycol and neopentyl glycol as main alcohol components.

3. The resin composition according to claim 1, wherein the ratio of polyester A to polyester B is in the range of from 40:60 to 20:80 by weight.

4. The resin composition according to claim 1, wherein said curing agent is used in such an amount that equivalency of the number of its functional groups to the number of hydroxyl groups in the polyester resins is from 0.8 to 1.2.

5. The resin composition according to claim 1, wherein said curing catalyst is used in an amount of 0.05 to 3 parts by weight per 100 parts by weight of the total amount of polyester A, polyester B and the curing agent.

6. The resin composition according to claim 1, wherein the hydroxyl value of said polyester A is in the range of from 2,000 to 5,000 g eq/$10^6$ g.

7. The resin composition according to claim 1, wherein each of said polyesters A and B has a softening point of from 50° to 150° C.

* * * * *